United States Patent
Sander

(10) Patent No.: US 6,245,976 B1
(45) Date of Patent: Jun. 12, 2001

(54) PLECTRUM AUXILIARY DEVICE FOR STRING MUSICAL INSTRUMENTS

(75) Inventor: Noam Sander, Tel Aviv (IL)

(73) Assignee: Pro Music Developments Ltd., Tel Aviv (IL)

( * ) Notice: Subject to any disclaimer, the term of this patent is extended or adjusted under 35 U.S.C. 154(b) by 0 days.

(21) Appl. No.: 09/555,893

(22) PCT Filed: Nov. 4, 1999

(86) PCT No.: PCT/IL99/00588

§ 371 Date: Jul. 27, 2000

§ 102(e) Date: Jul. 27, 2000

(87) PCT Pub. No.: WO00/26893

PCT Pub. Date: May 11, 2000

(30) Foreign Application Priority Data

Nov. 4, 1998 (IL) .......................................... 126880

(51) Int. Cl.⁷ ....................................................... G10D 3/16
(52) U.S. Cl. .................................................. 84/320; 84/743
(58) Field of Search ............................. 84/320, 322, 329, 84/723, 743

(56) References Cited

U.S. PATENT DOCUMENTS

| | | |
|---|---|---|
| 1,784,934 | 12/1930 | Johansson . |
| 4,064,781 * | 12/1977 | Fals ........................................ 84/322 |
| 4,320,689 * | 3/1982 | Pogoda ............................... 84/320 X |
| 4,365,537 * | 12/1982 | Pogoda ............................... 84/320 X |
| 5,300,730 | 4/1994 | Ekhaus . |
| 5,700,966 | 12/1997 | Lamarra . |
| 5,864,083 * | 1/1999 | Caren ................................. 84/322 X |

FOREIGN PATENT DOCUMENTS

99/40565   8/1999  (WO) .

* cited by examiner

Primary Examiner—Jeffrey Donels
(74) Attorney, Agent, or Firm—Ostrolenk, Faber, Gerb & Soffen, LLP

(57) ABSTRACT

A plectrum holding device for playing the guitar or the like string musical instruments comprises a handle-like casing unit (12, 14, 16) configured to be gripped by the player, with a mounting (18) for attaching a plectrum (20) in an operable playing position. Body portion (12) is provided with controls such as switching pad (22) with push buttons (24) and trackball (26), for remotely operating a variety of musical devices (A, B, C, D) such as synthesizers, VCRs, multi-effect producers, etc. In the example illustrated, the push buttons (24) and the trackball (26) are accessible by the thumb of the user, adapted to actuate infrared emitters (28, 29, 30).

24 Claims, 3 Drawing Sheets

PLECTRUM AUXILIARY DEVICE FOR STRING MUSICAL INSTRUMENTS

BACKGROUND OF THE INVENTION

The present invention generally relates to musical instruments and particularly to means for playing string instruments such as guitar. More specifically the invention concerns an auxiliary device for holding plectrums by which the string instruments are played.

As a rule, plectrums are held by the player between the forefinger and the thumb and so plucked against the strings to produce the sound. This traditional arrangement has not been changed for centuries in spite of various improvements and modifications of the playing instruments proper, for example, the so-called "electric" guitar and its variations.

In our co-pending PCT Application No. PCT/IL99/00068 filed Feb. 3, 1999, corresponding to U.S. patent application Ser. No. 09/601,603, filed Aug. 3, 2000, there has been described and claimed a plectrum holding device rendering the playing more convenient to the player (the "First Invention"). The contents of the above patent application is hereby incorporated by reference.

It has been found that the conceptual approach of our First Invention is extendible, opening a wide range of additional applications.

It is therefore an object of the present invention to convert the plectrum holder into a control center for operating any of a variety of electronic music performance and/or auxiliary systems, including the guitar proper.

It is a further object of the invention that the music and auxiliary systems be operated cordlessly, namely by remote control such as infrared radiation, laser beams, radio transmission and the like.

SUMMARY OF THE INVENTION

A plectrum holding device for playing the guitar or the like string musical instruments, comprising a handle-like casing unit, configured to be gripped by the player, means for attaching a plectrum to the casing in an operable playing position, signal transmission means, integrally implemented in the casing and manipulatable signal transmission means mounted on the casing in operable proximity with finger(s) of the player, the arrangement being such that by manipulating the control means, one or more of remotely located signal receiver devices are operated.

BRIEF DESCRIPTION OF THE DRAWINGS

These and additional constructional features and advantages of the invention will become more clearly apprehended in the light of the following description of preferred embodiments thereof, given by way of example only with reference to the accompanying drawings, wherein.

DETAILED DESCRIPTION OF THE PREFERRED EMBODIMENTS

Figure 1:
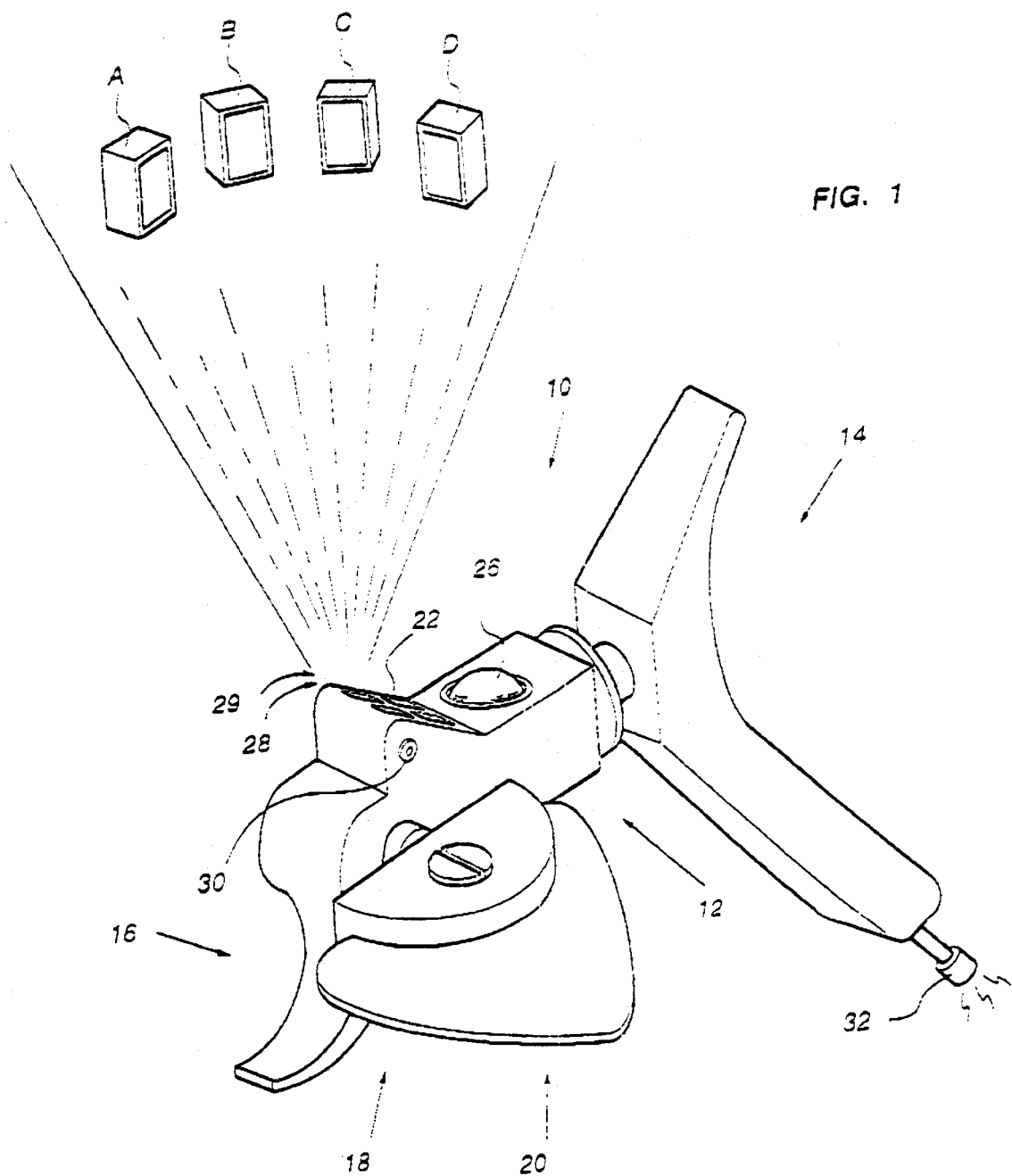
FIG. 1 is a schematic perspective front view of a plectrum holding device, featuring the characteristics of the present invention.
Figure 2:
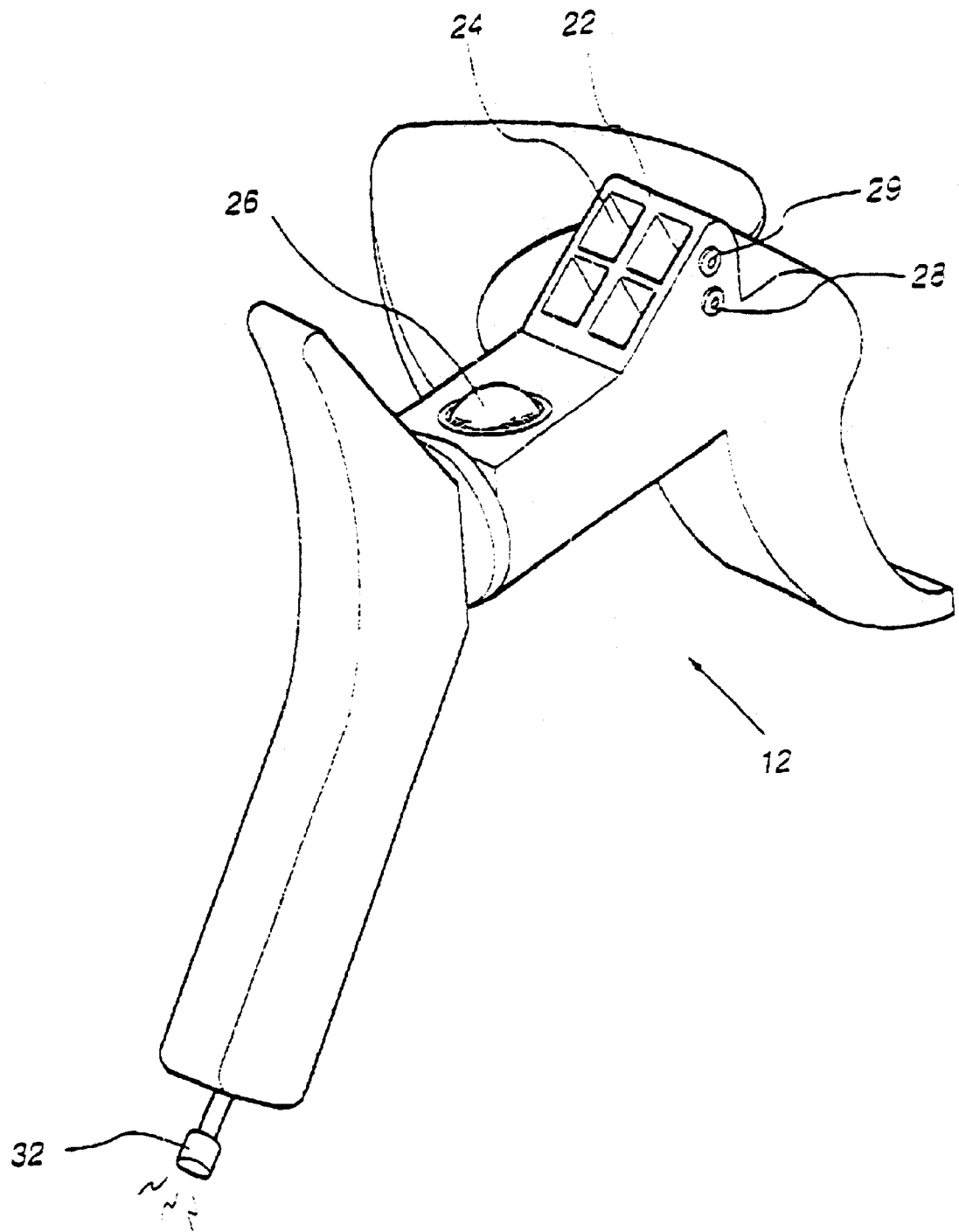
FIG. 2 is rear view of the of the device of FIG. 1.

As clearly seen in FIGS. 1 and 2 the plectrum device 10 possesses most of the main constructional features of the First Invention, namely, a central body portion generally denoted 12, rear butt-like rest 14, trigger-like forefinger-grip portion 16, and a mounting 18 for plectrum 20.

It should be emphasized that most or all of the previous device features may be incorporated but were omitted in the present context for the sake of clarity (for example, the pivotable mounting of the plectrum, the extendibility of the body portion and the provision of a switching attachment annexed to the rest 14).

In order to convert the plectrum holder into an electronic remote control center, as above mentioned, there are provided various operating switches and other manipulatable controls integrally mounted to the central body portion 12. Hence, a switching pad 22 is implemented, preferably extending in an inclined direction so as to be accessible by the thumb of the player. The pad is provided with a suitable number of push buttons or other types of controls 24 of any known design. A mouse-type pointer control ("trackball") 26 is installed, of the type customarily used lap-top computers for carrying out various functions as will be explained further below.

Figure 3:
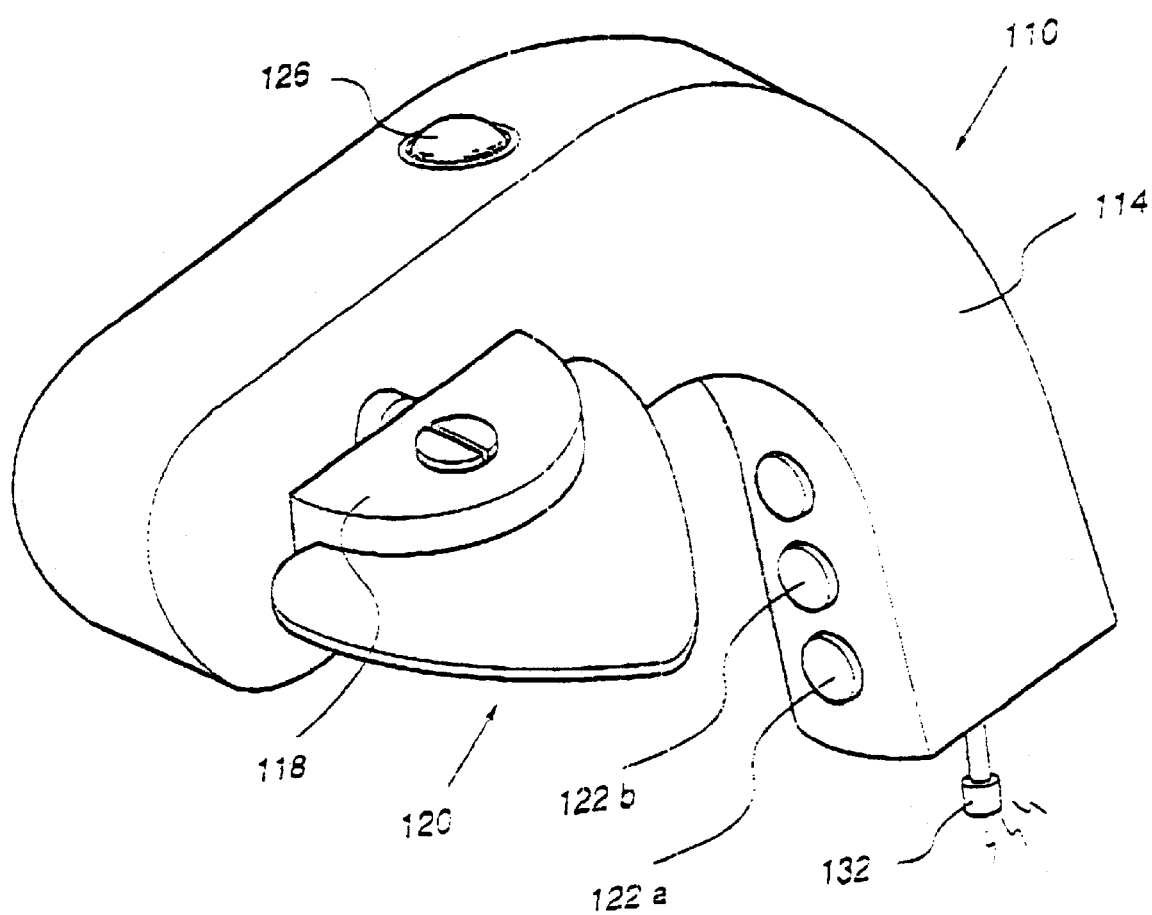
FIG. 3 is a schematic perpsective front view of a modified embodiment of the present invention.

Alternatively, the control buttons and/or trackball may be installed in other configurations, provided they are located within operable proximity with free fingers of the player (see FIG. 3).

As better seen in FIG. 2, one or more infrared remote control radiation units 28, 29 and 30, are installed, controlled by the buttons 24 and/or the trackball 26.

Within the range of the infrared remote control units 28 and 29 are located a variety of electronic musical and other instruments, as schematically shown and denoted A, B, C, D, e.g. synthesizers, Internet linked personal computers for displaying music lessons or notes; VCR operated guitar lessons or other musical directions; multi-color and other multi-effect devices; amplifiers of various types; "Karaoki" sound producers; and many others as applicable.

The player therefore will be spared the effort and inconvenience of interrupting the playing in order to walk to the respective instrument for switching it on and/or making adjustments, not to speak of replacing of the foot-operated controls presently used.

The rear-side directed infrared radiator 30 is functional to control certain effects associated with the guitar proper (not shown), e.g. volume or tone.

Any and all of these devices are remotely controlled in this example by infrared radiation. However, other means of transmission may readily be used, such as modulated red light modulated diode lasers; ultraviolet modulated signal generators; radio-wave range signal generators with frequency modulation or amplitude modulation or other wave lengths signal generators. In that case, antenna 32 will be provided, as shown.

FIG. 3 illustrates that a plectrum holder generally denoted 110 need not be designed along the lines of the First Invention. Hence, there could be provided a simple pistol-like holder 114 with plectrum mounting arrangement 118. Push buttons such as 122a and 122b may be provided as shown, again, with a "mouse" trackball 126. The transmission unit (not shown) can be again any of the selection already described in connection with the previous embodiment.

It will be thus appreciated that the conceptual approach on which the First Invention was based, is widely expanded to fulfill additional requirements that modern guitar players are interested to achieve.

While the above description contains many specificities, these should not be construed as limitations on the scope of the invention, but rather as exemplification of the preferred embodiments. Those skilled in the art will envision other possible variations that are within its scope. Accordingly, the scope of the invention should be determined not by the embodiment illustrated, but by the appended claims and their legal equivalents.

What is claimed is:

1. A plectrum holding device for playing a guitar or like string musical instrument, comprising:
   a handle-like casing unit, configured to be gripped by a player;
   means for attaching a plectrum to the casing unit in an operable playing position;
   signal transmission means, integrally implemented in the casing unit; and
   manipulatable control means mounted on the casing unit in operable proximity with finger(s) of the player for controlling the signal transmission means;
   wherein manipulating the control means operates one or more of remotely located electronic musical instruments responsive to the signal transmission means.

2. The device as claimed in claim 1, wherein the manipulatable control means includes one or more push buttons.

3. The device as claimed in claim 2, wherein the push buttons are located to be accessible by the thumb of the player.

4. The device as claimed in claim 1, wherein the manipulatable control means includes one or more trackball mouse pointer control members.

5. The device as claimed in claim 4, wherein one of the one or more trackball mouse pointer control members is located to be accessible by the thumb of the player.

6. The device as claimed in claim 1, wherein the signal transmission means comprises infrared wave radiation emitting means.

7. The device as claimed in claim 1, wherein the signal transmission means comprises radio wave transmission means.

8. The device as claimed in claim 1, wherein the casing unit comprises:
   an elongated body member;
   a butt-like rear member mounted to one end of the body member adapted to rest against a thumb root of the player; and
   a trigger-like front member mounted to the other end of the body member and configured to be gripped by a forefinger phalanx ankle of the player.

9. The device as claimed in claim 8, wherein the manipulatable control means is installed on a switching pad which extends in an up-right direction relative to the elongated body member, defining a pad up-right extension.

10. The device as claimed in claim 9, wherein the pad up-right extension includes a housing for infrared light radiators.

11. The device as claimed in claim 8, wherein the signal transmission means comprises an antenna mounted to the rear member.

12. The device as claimed in claim 9, wherein the manipulatable control means further comprises a trackball mouse pointer control mounted on the elongated body member.

13. A plectrum holding device for playing a guitar or like string musical instrument, comprising:
   a handle-like casing unit, configured to be gripped by a player;
   means for attaching a plectrum to the casing unit in an operable playing position;
   signal transmission means, integrally implemented in the casing unit; and
   manipulatable control means mounted on the casing unit in operable proximity with finger(s) of the player for controlling the signal transmission means;
   wherein manipulating the control means operates one or more of remotely located electronic instruments, responsive to the signal transmission means, selected from a synthesizer, an internet-linked computer, a VCR, a multicolor device, a multi-effect device, an amplifier and a Karaoki sound producer.

14. The device as claimed in claim 13, wherein the manipulatable control means includes one or more push buttons.

15. The device as claimed in claim 14, wherein the push buttons are located to be accessible by the thumb of the player.

16. The device as claimed in claim 13, wherein the manipulatable control means includes one or more trackball mouse pointer control members.

17. The device as claimed in claim 16, wherein one of the one or more trackball mouse pointer control members is located to be accessible by the thumb of the player.

18. The device as claimed in claim 13, wherein the signal transmission means comprises infrared wave radiation emitting means.

19. The device as claimed in claim 13, wherein the signal transmission means comprises radio wave transmission means.

20. The device as claimed in claim 13, wherein the casing unit comprises:
   an elongated body member;
   a butt-like rear member mounted to one end of the body member adapted to rest against a thumb root of the player; and
   a trigger-like front member mounted to the other end of the body member and configured to be gripped by a forefinger phalanx ankle of the player.

21. The device as claimed in claim 20, wherein the manipulatable control means is installed on a switching pad which extends in an up-right direction relative to the elongated body member, defining a pad up-right extension.

22. The device as claimed in claim 21, wherein the pad up-right extension includes a housing for infrared light radiators.

23. The device as claimed in claim 20, wherein the signal transmission means comprises an antenna mounted to the rear member.

24. The device as claimed in claim 21, wherein the manipulatable control means further comprises a trackball mouse pointer control mounted on the elongated body member.

\* \* \* \* \*